(12) United States Patent
Whetstone et al.

(10) Patent No.: US 7,198,562 B2
(45) Date of Patent: Apr. 3, 2007

(54) ANIMAL DRESSING TOOL

(76) Inventors: Gregory Jack Whetstone, 101 Desert Rd., White Water, CO (US) 81527; Charles L. Burrows, II, 2834 No. B, Grand Junction, CO (US) 81503

( * ) Notice: Subject to any disclaimer, the term of this patent is extended or adjusted under 35 U.S.C. 154(b) by 0 days.

(21) Appl. No.: 10/795,692

(22) Filed: Mar. 8, 2004

(65) Prior Publication Data

US 2005/0227601 A1  Oct. 13, 2005

(51) Int. Cl.
A22C 29/02 (2006.01)

(52) U.S. Cl. ......................................................... 452/6

(58) Field of Classification Search ................. 81/386, 81/394, 405, 416; 30/134, 135, 293, 294, 30/123; 452/6, 102, 103, 135–137
See application file for complete search history.

(56) References Cited

U.S. PATENT DOCUMENTS

| | | | | | |
|---|---|---|---|---|---|
| 172,649 | A | * | 1/1876 | Pease ........................... | 81/394 |
| 233,410 | A | * | 10/1880 | Hale ............................ | 30/134 |
| 614,167 | A | * | 11/1898 | Gardella ...................... | 30/135 |
| 1,387,659 | A | * | 8/1921 | O'Keefe ....................... | 81/394 |
| 1,650,948 | A | * | 11/1927 | Long ........................... | 30/135 |
| 3,284,896 | A | * | 11/1966 | Reichborn-Kjennerud ... | 30/134 |
| 4,296,655 | A | * | 10/1981 | Tesoro ......................... | 81/405 |
| 5,226,236 | A | * | 7/1993 | Harrington, III ............. | 30/134 |
| 5,996,450 | A | * | 12/1999 | St. John ....................... | 81/416 |

* cited by examiner

Primary Examiner—Thomas Price
(74) Attorney, Agent, or Firm—Edwin L. Hartz

(57) ABSTRACT

A bladed lever for cutting through or splitting animal bones having a head, a handle and a knife with the head having two sides with a row of teeth at the bottom of each side to grip the bone to be cut or split and the knife having a blade positioned below and between the two sides of the head at a distance to permit the bone to be split to fit between the teeth of the head and the blade of the knife.

5 Claims, 10 Drawing Sheets

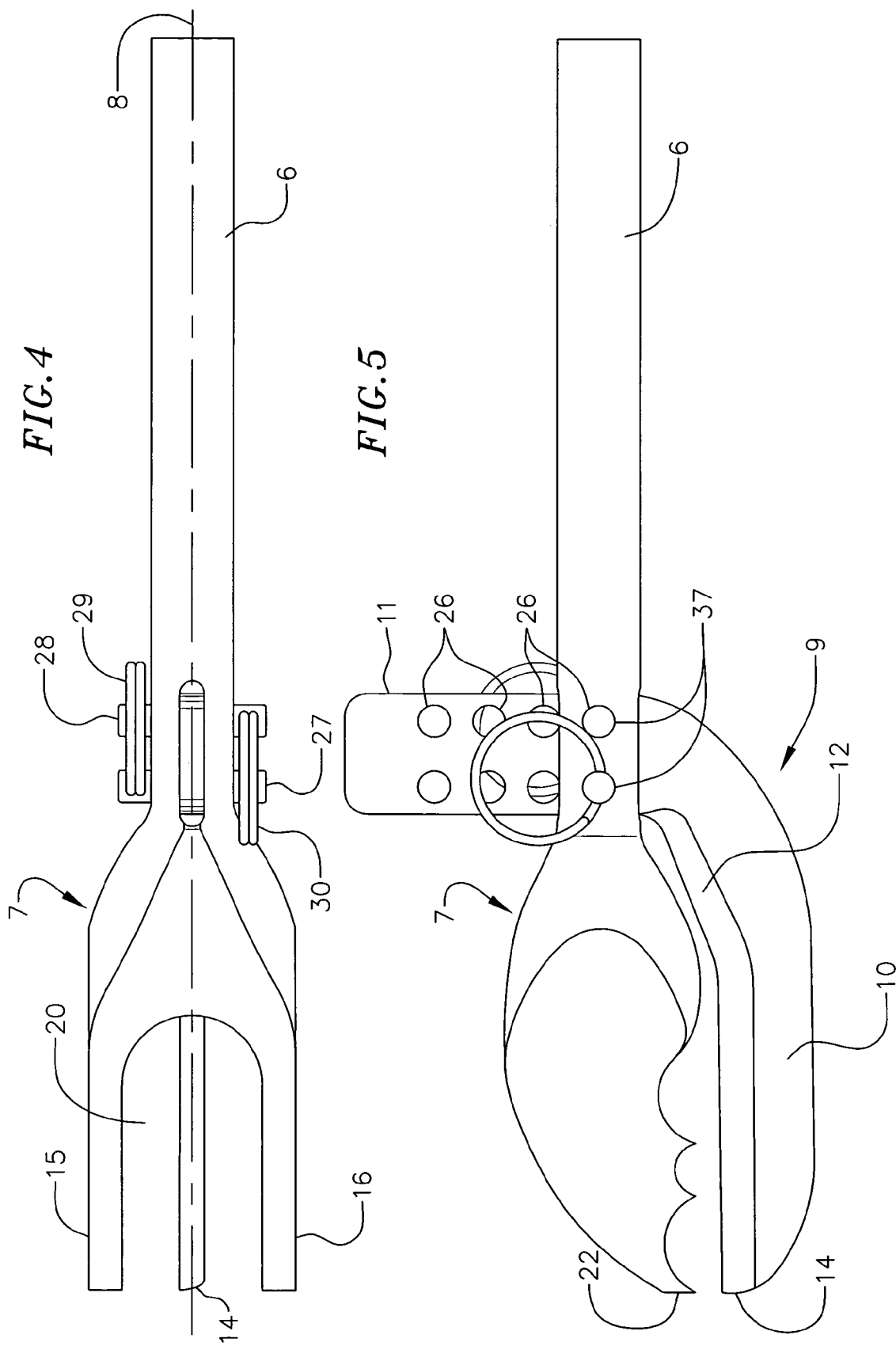

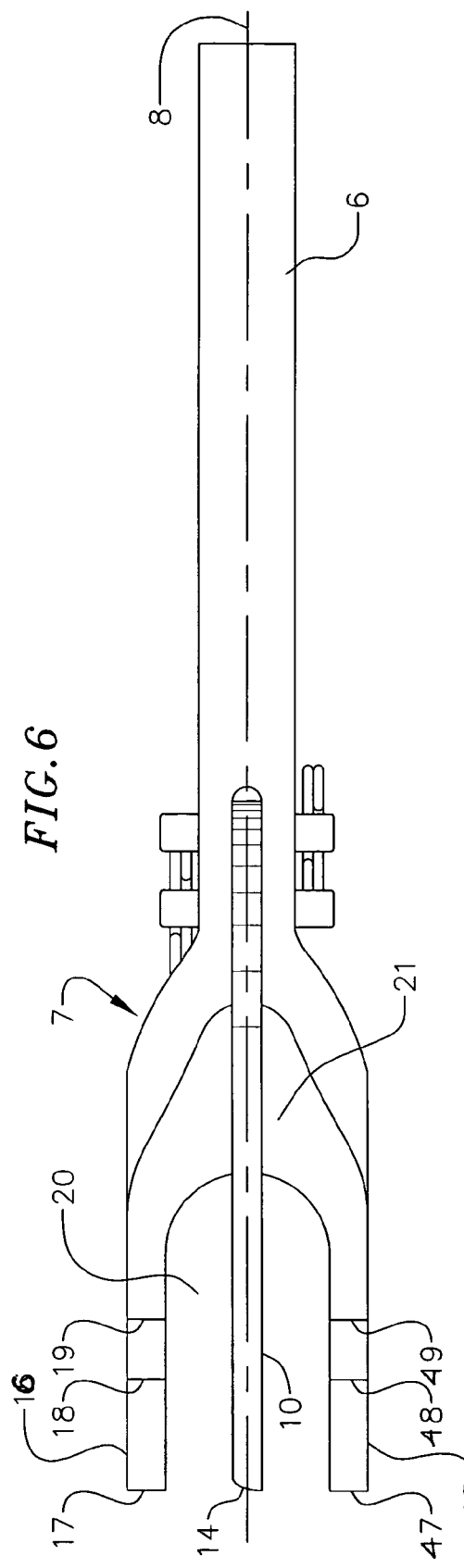
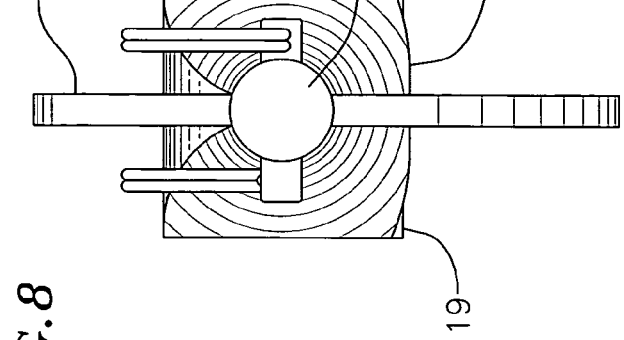
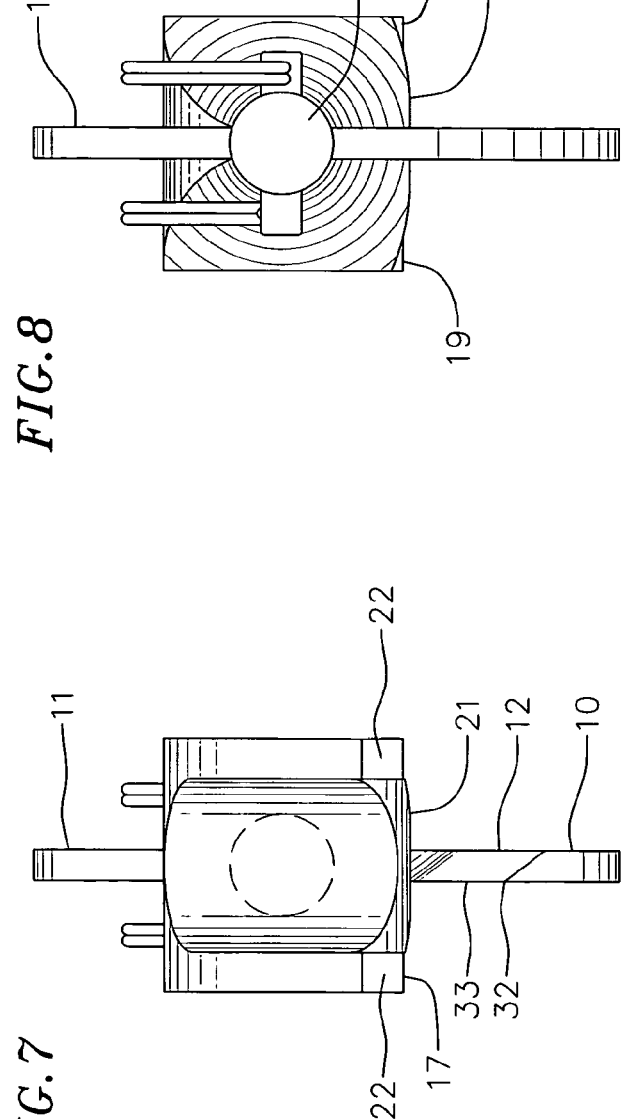

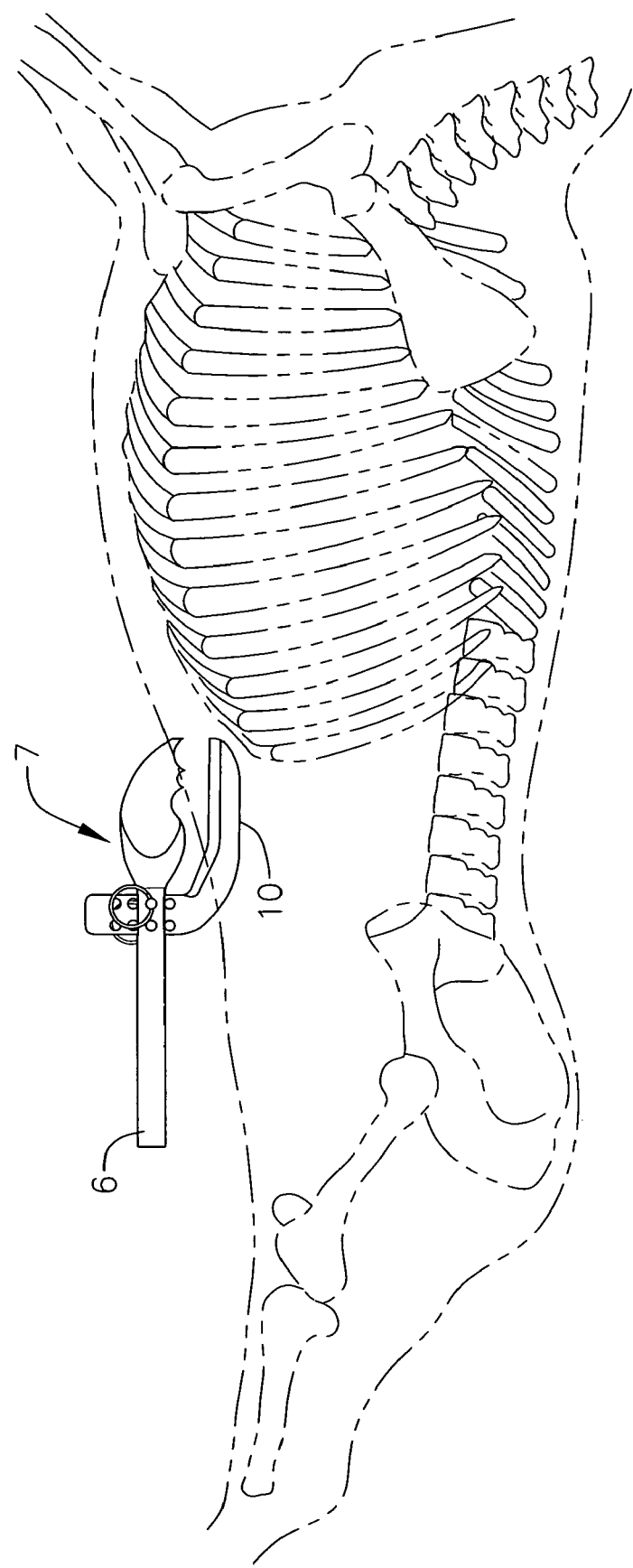

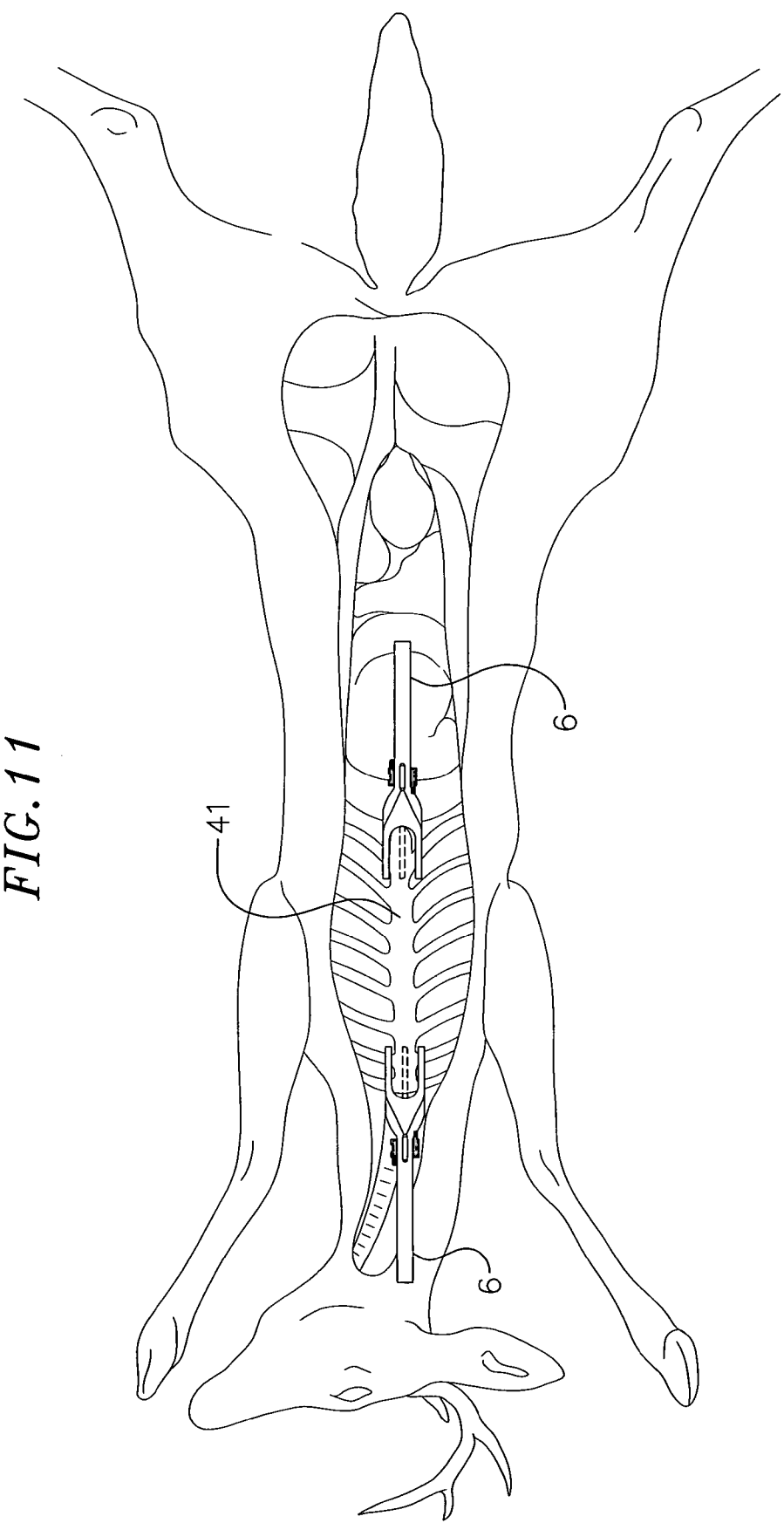

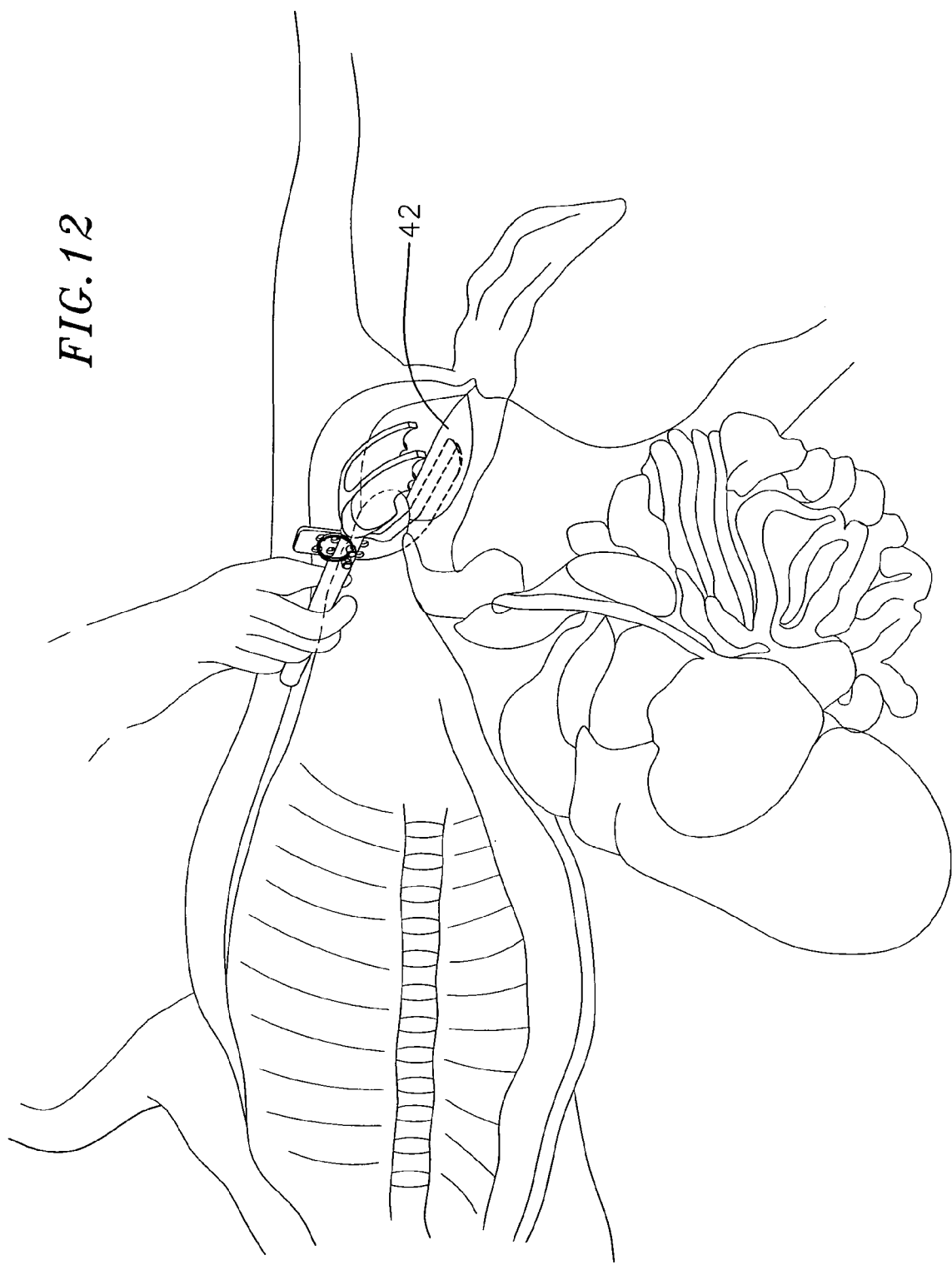

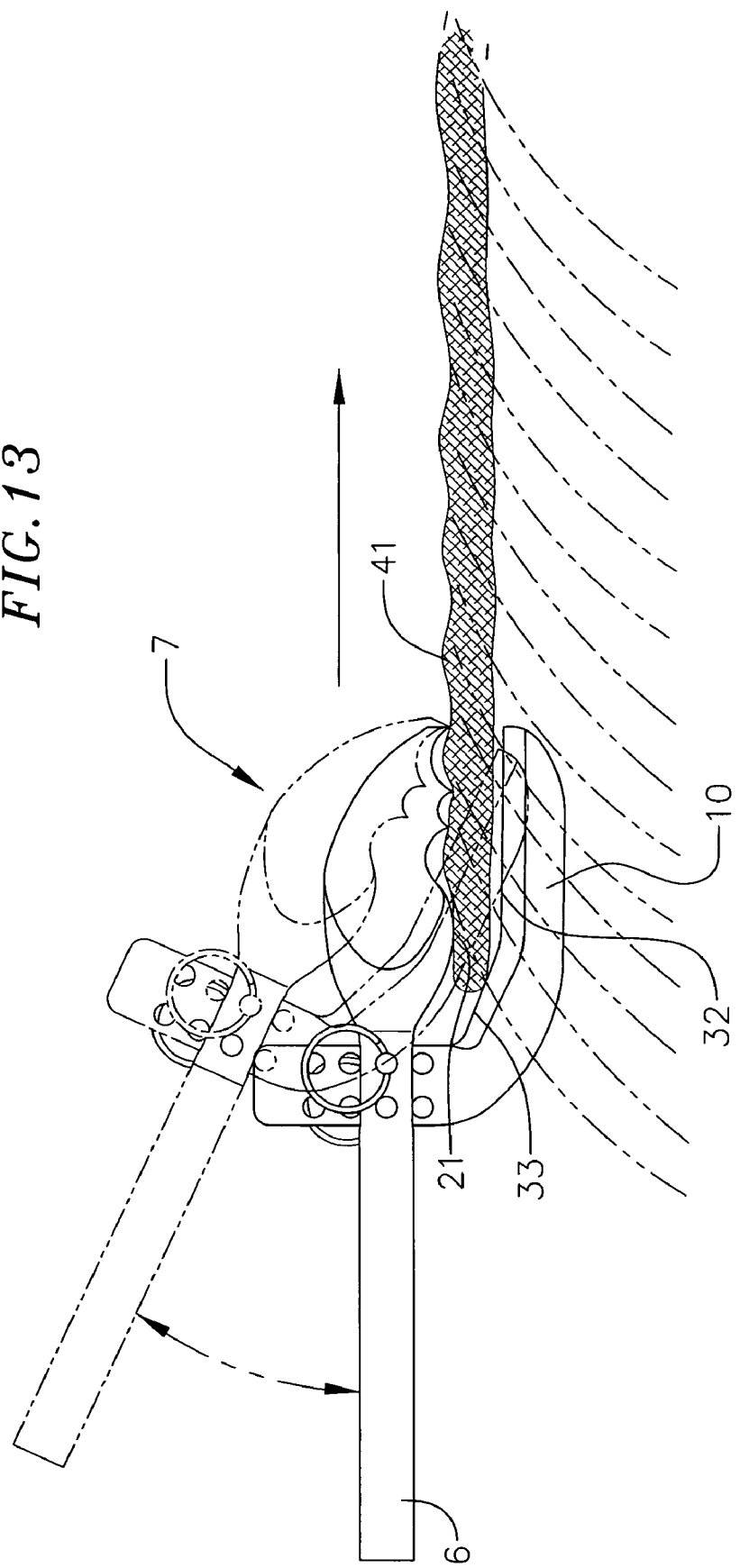

ANIMAL DRESSING TOOL

BACKGROUND OF THE INVENTION

1). Field of Invention

This invention relates to dressing large animals, wild and domestic, and more particularly to a tool having a bladed lever for cutting through or splitting bones.

2). Related Art

The dressing of animals, particularly the field dressing of large animals, such as for example deer and elk, can be both dangerous and time consuming. A typical approach for field dressing large animals, using deer as an illustrative example, includes the following steps:

The hind legs of the deer are propped open and the head of the deer is typically placed at a higher level than the rear end of the deer. A shallow cut is made with a clean knife at the bottom of the breastbone. Thereafter, the body cavity is opened. This is done by using a knife that is placed within the first cut with the blade facing upwards. Two fingers of the hand not holding the knife are inserted into the cut to guide the knife while cutting or slitting the hide of the deer. The fingers of the hand not holding the knife push the entrails away from the blade and guide the knife as the incision is made along the midline of the deer from the breastbone to the pelvis. Next the reproductive organs are removed and the skin is cut from the pelvis to the anus. Additionally, the skin and muscle is cut from the bottom of the breastbone to the brisket or jaw. These cuts expose the pelvic bone and the rib cage, both of which need to be cut to provide access to the inner cavity of the animal. The rib cage is then split at the breastbone by cutting through the breastbone with a knife. On older animals and large animals it is sometimes necessary to use a small saw to split the rib cage at the breastbone. The pelvic bone is split with a saw. The entrails are removed and the inside of the deer is cleaned out, with the rib cage and pelvic bone having been split.

The most dangerous step in this process is splitting the rib cage with a knife and the splitting of the pelvic bone with a saw, knife or axe. Often times a saw or axe is not available so that the pelvic bone is also split using a knife. Severe injury has been caused to hunters using a knife to split either the rib cage or the pelvic bone; sometimes the injury has resulted in death. There is a definite safety consideration in using knives in dressing an animal.

SUMMARY OF THE INVENTION

It is an object of this invention to provide an efficient, easy to use, and safe tool for splitting the bones of an animal. This tool is particularly safe and easy to use in splitting the rib cage along the breastbone and the pelvic bone of wild and domestic animals. The tool has three basic parts, two of which may be integral. The parts are a handle, a head and a knife. The handle and head may be made from a rod of desired length. The knife has a blade portion and an attachment arm with the attachment arm passing through a hole in the rod near the head to be securely attached to the rod. The head acts a gripper and has jaws or claws for holding the animal and for holding the tool in place while the blade is used to split the bone and the tissue around the bone. The gripper has two rows of teeth along the bottom of two sides that grip the animal from the outside while the blade is inserted on the inside. The bone to be severed fits between the gripper and the blade.

If the head and handle are made as separate pieces they may be welded together or otherwise joined to form a unitary body for the tool. When the handle and head are machined from square bar stock, a cylindrical portion at the handle end is machined for the greater length of the bar or rod. The handle end is cylindrical to provide a surface that is easy to grip and to manipulate in use. Further the handle has an elastic sleeve over six inches of the handle for better gripping of the tool and for warmth in cold weather. A good material for the sleeve is rubber. The head has two elongated sides approximately one-quarter inch thick or wide with teeth on the bottom side for gripping the animal where the bone is to be cut.

The knife has an elongated blade approximately two and one-half inches long with an attachment arm that is perpendicular to the blade of the knife. The attachment arm is approximately two and one-half inches long and fits in a hole in the handle that is of rectangular cross section with the ends rounded to provide a smooth surface rather than sharp edges. The attachment arm has several rows of holes that cooperate with a pair of holes in the handle for adjusting the distance of the blade from the teeth of the gripper head. A pair of pins hold the attachment arm of the knife in place in the handle of the tool. The blade is spaced a sufficient distance apart from the teeth to permit the bones to be cut to fit between the teeth of the gripper head and the blade. The bones of the animal are split by holding the outside of the animal in the area where the bones are to be split and cutting the bones from the inside by lifting the blade against the gripper head that is holding the area of the animal in place as well as holding the tool in place.

Objects, features and advantages of this invention will become apparent from a consideration of the foregoing and the following description, the appended claims and the accompanying drawings.

BRIEF DESCRIPTION OF THE DRAWINGS

FIG. 4 is a top plan view of the tool, in accordance with the present invention;

FIG. 5 is a right side elevation view of the tool in its carrying position, in accordance with the present invention;

FIG. 6 is a bottom plan view of the tool, in accordance with the present invention;

FIG. 7 is a front elevation view of the tool, in accordance with the present invention;

FIG. 8 is a rear end elevation view of the tool, in accordance with the present invention;

FIG. 10 is a right side elevation view of the rib cage of the deer to be split with the tool of this invention, in accordance with the present invention;

FIG. 11 is a top plan view of the use of the tool in splitting the rib cage along the breastbone of the deer, in accordance with the present invention;

FIG. 12 is a perspective view from the right front of the tool showing the tool in use in splitting the pelvic bone of a deer, in accordance with the present invention; and FIG. 13 is a right side elevation view of the tool in use in splitting the bones of an animal, in accordance with the present invention.

DESCRIPTION OF PREFERRED EMBODIMENTS

Figure 1:
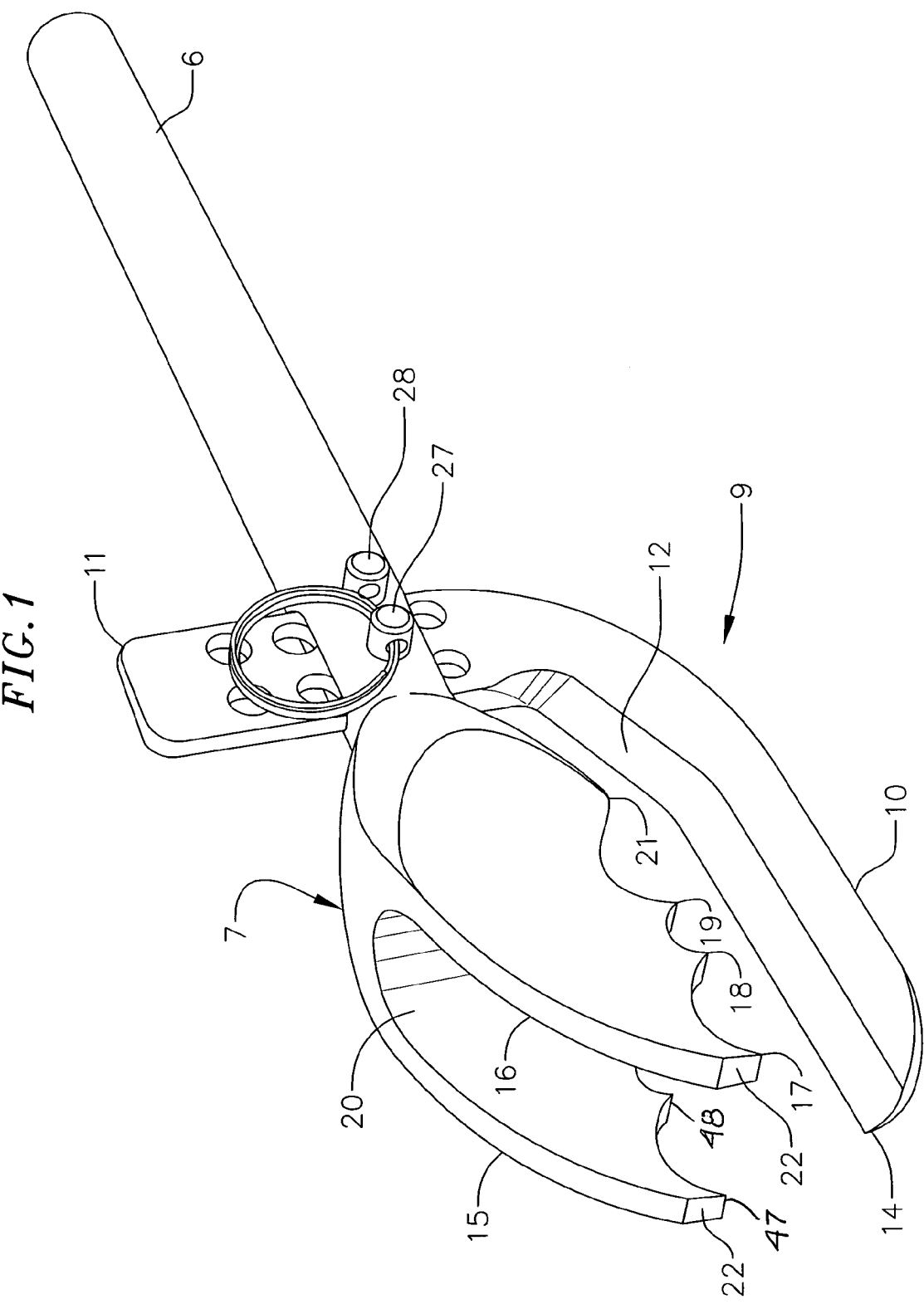
FIG. 1 is a perspective view from the right front end of the tool, in accordance with the present invention.
Figure 2:
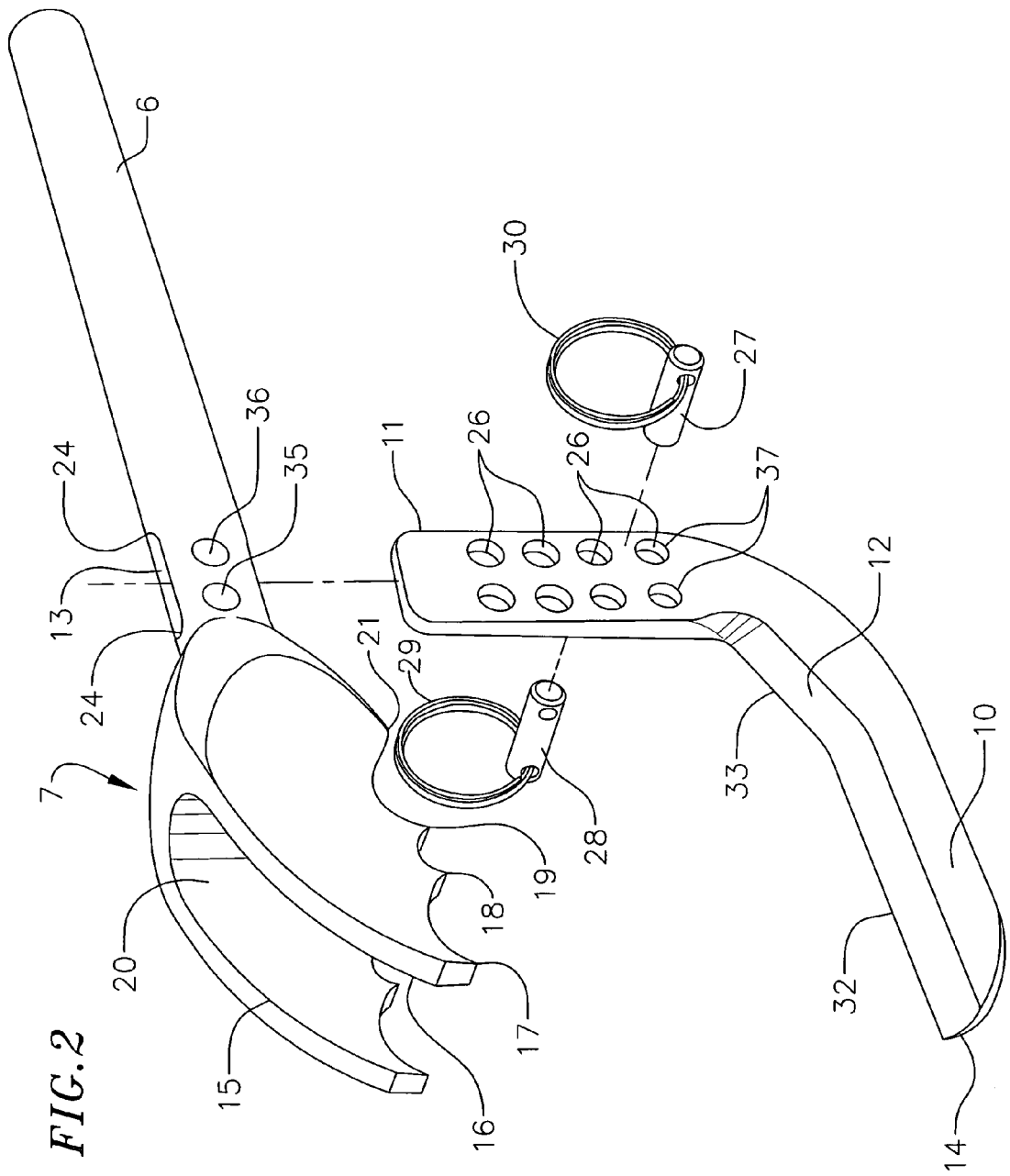
FIG. 2 is a perspective view from the right front end of the tool with the tool in an exploded view, in accordance with the present invention.

The dressing of animals requires the splitting of bones, especially the rib cage along the breastbone and the pelvic bone. In the past this has been done with knives or axes or saw blades. When done with knives, there have been serious injuries and even death from attempting to split the bones. Additionally, many knives have been broken or damaged by being hit with objects, such as the butt of a rifle while attempting to split bones.

The tool of this invention is safe and easy to use in splitting the bones, especially when field dressing an animal such as a deer. The tool also cuts any tendons, muscle or ligaments (tissue) that may be around the bone to be split. The animal-dressing tool shown in FIGS. 1–8 includes a handle 6 and a gripping or gripper head 7 and a knife 9

Advantageously the handle 6 and gripping head 7 are machined from a square bar or rod of aluminum. Other materials having sufficient rigidity and ruggedness, such as stainless steel or titanium, may also be used in place of aluminum. Further, the knife 9 is made from a different material than the handle 6. The knife 9 is preferably made from one-eighth inch stainless steel. The square aluminum bar stock for the head and handle is 1½ inches square and 12 inches long. The resultant tool is lightweight, easy to handle and sufficiently strong to break the bones, or split the bones of the larger or older wild animals and domestic animals.

The gripping head 7, which has an overall length of three and one-half inches, has a left side 15 and a right side 16 (when viewed from the front) that are separated by a channel 20. The width of each side 15 and 16 is ¼ inch and the sides are strong enough to withstand the pressures encountered when splitting the bones of large animals. A plurality of teeth are formed in a row along the bottom of each elongated side 15 and 16. There is a front tooth 17, a middle tooth 18 and a rear tooth 19 on the right side 16 and, similarly, on the left side 15, there is a front tooth 47, a middle tooth 48 and rear tooth 49, which provide the gripping ability of the bone-splitting tool. Behind the teeth 17–19 and 47–49 there is a rounded surface 21 that is useful in inserting the tool in the area of the animal where the bone is to be cut and also for releasing the tool after a cut has been made. When a 1½ inch square bar is used, the rounded surface 21 has a width of approximately 1-inch as shown in FIGS. 7 and 8.

The tool further includes a knife 9, having a blade end 10 and an attachment arm 11 that is at a right angle to the blade 10. The attachment arm is two and one-half inches long. The blade 10 is two and one-half inches long and has a cutting surface 32 that faces the teeth of the gripping head 7. The knife 9 further includes a transition portion 12 that is at an angle between the blade 10 and the attachment arm 11. The transition portion 12 angles up from the cutting edge 32 at an angle of 30 degrees. This angle is preferably between 25 degrees and 35 degrees, but the tool will operate with greater or lesser angles of the transition portion 12 with respect to the cutting edge 32. The transition portion 12 also has a cutting edge 33 for cutting the bone and tissue of the animal.

The attachment arm 11 of the knife 9 fits in a hole 13 in the handle 6 of the tool. The hole 13 is rectangular in shape with rounded ends 24. The attachment arm 11 has a matching rectangular shape with rounded ends and is slightly smaller than the hole 13 for ease of insertion of the attachment arm 11 into and through the hole 13. The attachment arm 11 has a plurality of locking holes 26 that are formed in four rows and two columns. There may be fewer or more rows of locking holes 26 depending upon the desired distance between the cutting edge 32 of the blade 10 and the teeth 17–19 and 47–49 of the gripping head 7.

There are a pair of holes 35 and 36 that pass though the side of the handle in the area of the hole 13 and perpendicular to the hole 13. The holes 35 and 36 cooperate with the locking holes 26 in the attachment arm to hold the attachment arm in place in the handle 6. When a row of the locking holes 26 in the attachment arm 11 line up with the holes 35 and 36 in the handle 6, a pair of pins 27 and 28 are inserted through the holes 35 and 36 and the locking holes 26 of the attachment arm 11.

The sides 15 and 16 of the gripper head 7 are symmetrical about a plane that passes through the centerline 8 of the handle 6 and gripper head 7. The rectangular hole 13 is also symmetrical about this plane that passes though the centerline 8.

The attachment arm 11 is placed in its uppermost position in the handle 6 where the lowest row 37 of locking holes 26 are aligned with holes 35 and 36 in the side of the handle 6 (shown in FIG. 5). The pins 27 and 28 hold the attachment arm in this position, which is the carrying position for the bone splitting tool. The tip 14 of the blade 10 of the knife 9 does not extend beyond the front end 22 of the gripper head 7 for safety reasons. The bone-splitting tool is kept in the position shown in FIG. 5 with the least distance between the cutting edge 32 of blade 10 and teeth 17–19 and 47–49 of gripper head 7 until the tool is to be used. At the time of use, the pins 27 and 28, which have pull rings 30 and 29, respectively, are pulled out of the holes 35 and 36 and the corresponding locking holes 26 in the attachment arm 11. The distance between the cutting edge 32 and the bottom of teeth 17–19 and 47–49 is adjusted to accommodate the dimensions of the bones of the animals to be split. For large animals, such as elk, the distance will be greater than it will be for small animals, such as deer.

The base of the blade 10 and the transition portion 12 are ⅛th inch wide and are ground to the top to provide the cutting edge 32 and 33. The pins 27 and 28 are ¼ inch in diameter with the holes 35 and 36 and the locking holes 26 being slightly larger to accept the ¼ inch diameter pins 27 and 28. The gripping head 7 may have different configurations, but as shown in the FIG. 1–3 and 5, the top of the head is rounded and there is a channel 20 between the sides 15 and 16 to reduce the overall weight of the bone splitting tool.

Figure 3:
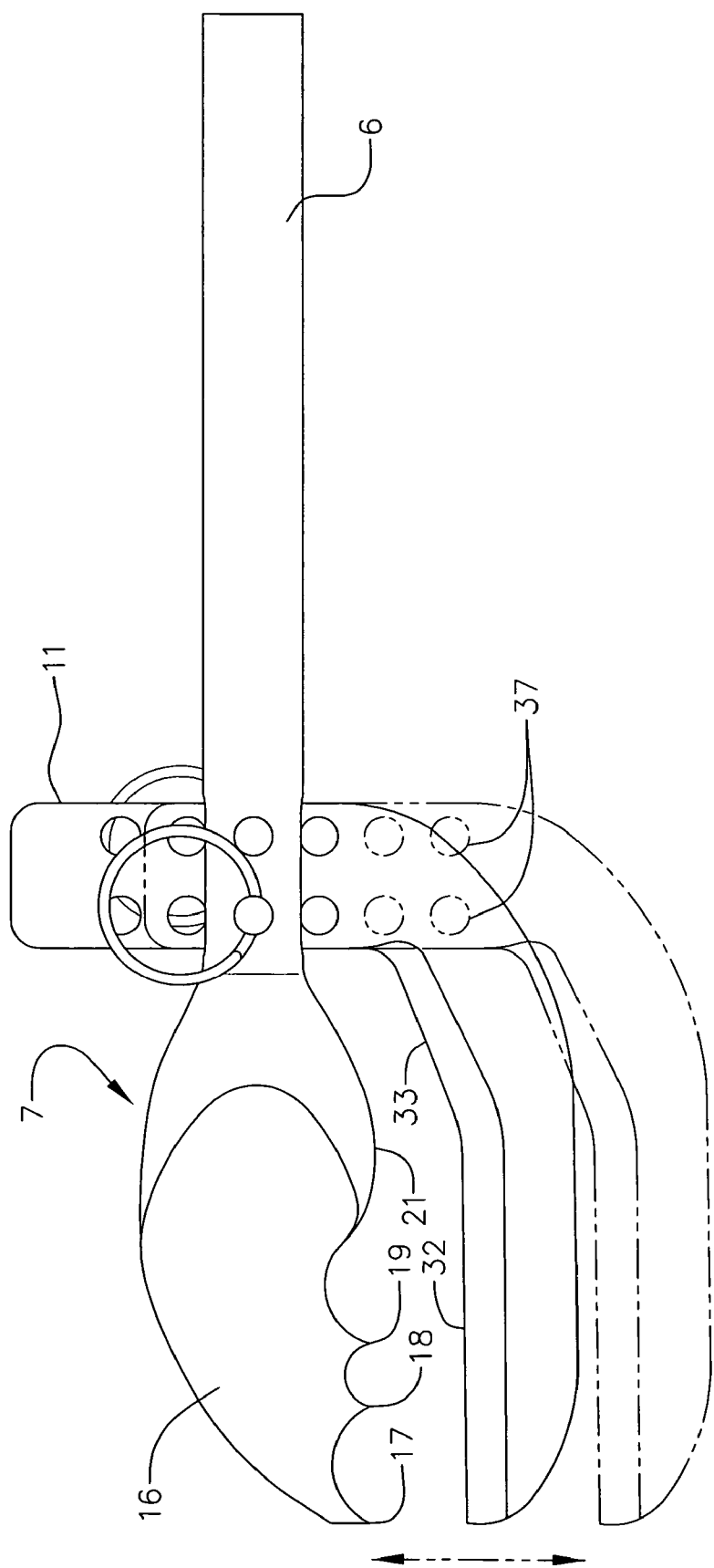
FIG. 3 is a right side elevation view of the tool showing the adjustable positions of the blade relative to the gripper head, in accordance with the present invention.

As shown in the drawings and particularly FIGS. 3, 5 and 7, the bottom edges or sharp ends of teeth 17–19 and 47–49 lie in a plane which is essentially parallel to the cutting edge 32 of the blade 10. Also shown in FIG. 7 the cutting edge 32 is parallel to the longitudinal length of the handle 6. As a consequence, the movement of the attachment arm in the hole 13 of the handle 6 results in the spacing at each end of the blade 10 relative to the corresponding end of the head 7 is simultaneously changed a fixed distance at each end.

Figure 9:
FIG. 9 is schematic view of a deer being cut open with a knife to expose the bones to be split, in accordance with the present invention.

The method of splitting animal bones with the bone splitting tool of FIGS. 1–8 is described in connection with the drawings of FIGS. 9–13. The dressing of a deer 40 will be used as illustrative of the method of splitting bones in all animals, domestic and wild. The animal is placed on its back as shown in FIG. 9 and a knife is used to open up the cavity of the animal by making a slit from the pelvic bone area up to the brisket or jaw of the animal. The cutting of the skin or underside of the animal between the pelvic bone and jaw exposes both the rib cage and the pelvic bone. Once the rib cage is exposed, as shown in FIGS. 10 and 11, the bone splitting tool is adjusted to have the proper distance between the cutting edge 32 and the teeth 17–19 and 47–49 of the gripping head 7.

A short cut or splitting of the bones is first made either from the bottom of the rib cage or from the top of the rib cage near the jaw of the animal. Once the initial cut and splitting of bone is accomplished the tool is removed and placed at the opposite end of the rib cage. The tool is operated as shown in FIG. 13 with the gripper head 7 on the outside of the animal and the blade 10 on the inside of the animal with the blade 10 and gripper head 7 being separated by the bone and tissue of the animal that is to be cut. As shown in FIG. 13, the blade 10 is pushed under the bone, such as the breastbone 41 while the gripping head 7 is placed on the outside or top of the breastbone 41. The tool is moved forward until the cutting edge 33 of the transition portion 12 meets the bone and tissue that are to be cut. The rounded surface 21 of the gripping head 7 aids in the forward movement of the tool onto the breastbone 41. Once the forward movement of the cutting edge 33 is stopped by the bone and tissue, the handle 6 is lifted in a lever action to cut through the bones. The teeth 17–19 and 47–49 provide pivot points about which the tool rotates upwardly with the cutting edge 32 of the blade 10 cutting through or splitting the bone 41. The front teeth are the final pivot point as the handle is lifted. Similar cutting or splitting action takes place when the bone that is being cut is the pelvic bone 42 rather than the breastbone of the rib cage. The positioning of the tool to cut the pelvic bone is shown in FIG. 12 where again the gripper head 7 is on the outside of the bone and the blade 10 is under the bone that is to be cut.

The blade 10 should be aligned with the breastbone or the center of the pelvic bone to be cut. Additionally the blade should contact the bone to be cut at a right angle or the plane of the blade should be parallel to the plane where the cut is desired for the most effective and efficient cutting. Further, the greater the distance between the two sides of the head the greater the stability of the tool to cut along the desired line. It is to be noted that the one and one-half inch spacing between the outside surface of the two sides of the tool made from one and one-half inch bar stock has been found to be adequate.

There may be occasions where it is desired to remove the majority of the rib cage. In this event, the bones of the rib cage are cut or split near the backbone of the animal. Thus, the cut is made between the front and back of the rib cage along one side, and preferably close to the backbone; and also between the front and back of the rib cage along the opposite side; again preferably near the backbone.

Although the description above contains specificity, this should not be construed as limiting the scope of the invention, but merely as providing illustrations of one of the presently preferred embodiments of the invention. Although preferred embodiments and method for splitting bones of animals have been described, the invention is not limited to the specific embodiments, but rather the scope of the invention is to be determined as claimed.

What is claimed is:

1. A tool for splitting bones of an animal comprising an elongated handle having a longitudinal axis, an elongated gripper head extending from the handle along the longitudinal axis of the handle and a knife having an elongated blade with a cutting edge facing the gripper head and an attachment arm that is perpendicular to the blade and when attached to the handle is perpendicular to the longitudinal axis of the handle so that the cutting edge faces the gripper head and extends along the length of the gripper head a fixed distance from the gripper head when the knife is attached to the handle and in use.

2. A tool according to claim 1 further comprising a first hole in the handle for receiving the attachment arm wherein the distance between the blade and the gripper head is adjustable by movement of the attachment arm within the hole in the handle.

3. A tool according to claim 2 further comprising a plurality of rows of holes in the attachment arm and a pair of holes in the handle in the area of the first hole to cooperate with a selected row of holes in the attachment arm to hold the cutting edge of the blade a selected fixed distance from the gripper head and a pair of removable pins that pass through the pair of holes in the handle and a selected pair of holes in the attachment arm.

4. A tool according to claim 1 wherein the head has two elongated sides symmetrical with respect to the cutting edge and having teeth along the bottom of each side.

5. A tool according to claim 4 wherein the head is three and one-half inches long, and one and one-half inches wide, the elongated sides are one-fourth inch wide and the handle is eight and one-half inches long.

* * * * *